United States Patent
Yu et al.

(10) Patent No.: US 8,908,010 B2
(45) Date of Patent: *Dec. 9, 2014

(54) METHOD FOR PROCESSING VIDEO INPUT BY DETECTING IF PICTURE OF ONE VIEW IS CORRECTLY PAIRED WITH ANOTHER PICTURE OF ANOTHER VIEW FOR SPECIFIC PRESENTATION TIME AND RELATED PROCESSING APPARATUS THEREOF

(71) Applicant: Mediatek Inc., Hsin-Chu (TW)

(72) Inventors: Ya-Hui Yu, Hsinchu County (TW); Jer-Min Hsiao, Taipei (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 0 days.
This patent is subject to a terminal disclaimer.

(21) Appl. No.: 14/138,154

(22) Filed: Dec. 23, 2013

(65) Prior Publication Data

US 2014/0104384 A1    Apr. 17, 2014

Related U.S. Application Data

(63) Continuation of application No. 13/094,803, filed on Apr. 26, 2011, now Pat. No. 8,643,699.

(51) Int. Cl.
*H04N 13/00* (2006.01)
*H04N 19/597* (2014.01)
*H04N 19/51* (2014.01)

(52) U.S. Cl.
CPC ..... *H04N 13/0051* (2013.01); *H04N 19/00769* (2013.01); *H04N 19/00587* (2013.01); *H04N 13/0059* (2013.01); *H04N 13/0048* (2013.01); *H04N 13/0029* (2013.01)
USPC ................ 348/43; 348/46; 348/49; 348/50; 348/51; 348/54; 348/55; 345/419; 375/240.26; 375/240.27; 375/240.28; 386/201; 386/203; 386/228; 386/229; 386/344; 386/351

(58) Field of Classification Search
USPC ........ 348/43, 46, 49, 50, 51, 54, 55; 345/419; 375/240.26, 240.27, 240.28; 386/201, 386/203, 228, 229, 344, 351
See application file for complete search history.

(56) References Cited

U.S. PATENT DOCUMENTS

| | | | |
|---|---|---|---|
| 8,582,953 B2 * | 11/2013 | Kato | ............................. 386/241 |
| 2004/0066846 A1 | 4/2004 | Yun | |
| 2007/0139612 A1 | 6/2007 | Butler-Smith | |
| 2009/0195640 A1 | 8/2009 | Kim | |

(Continued)

FOREIGN PATENT DOCUMENTS

| | | |
|---|---|---|
| CN | 101472190 A | 7/2009 |
| EP | 2 265 031 A1 | 12/2010 |

(Continued)

OTHER PUBLICATIONS

Hasegawa et al. JP2003-319419 JPO Full Text and Abstract Translation. Nov. 2003.*

*Primary Examiner* — Christopher S Kelley
*Assistant Examiner* — Zhihan Zhou
(74) *Attorney, Agent, or Firm* — Winston Hsu; Scott Margo

(57) ABSTRACT

A method of processing a video input, having a first video bitstream transmitting pictures of a first view and a second video bitstream transmitting pictures of a second view, includes: checking the video input to detect if a first picture of one of the first and second views is correctly paired with a second picture of the other of the first and second views for specific presentation time; and referring to a detecting result for selectively performing a predetermined processing operation upon the video input. The video input transmits the second picture while transmitting the first picture. When the detecting result indicates that the first picture is not correctly paired with the second picture for the specific presentation time, both of the first picture and the second picture are skipped, and previous pictures that are correctly paired with each other for the specific presentation time is repeated.

18 Claims, 5 Drawing Sheets

(56) References Cited

U.S. PATENT DOCUMENTS

| | | |
|---|---|---|
| 2010/0321472 A1* | 12/2010 | Kuwabara et al. ............ 348/43 |
| 2011/0025825 A1* | 2/2011 | McNamer et al. ............ 348/46 |
| 2011/0050869 A1 | 3/2011 | Gotoh |
| 2011/0157331 A1* | 6/2011 | Jang ............................... 348/54 |
| 2012/0170831 A1 | 7/2012 | Beato |

FOREIGN PATENT DOCUMENTS

| | | |
|---|---|---|
| JP | 2003319419 | 11/2003 |
| WO | 2010116955 A1 | 10/2010 |
| WO | 2010143759 A1 | 12/2010 |
| WO | WO 2010143759 A1 * | 12/2010 |

* cited by examiner

METHOD FOR PROCESSING VIDEO INPUT BY DETECTING IF PICTURE OF ONE VIEW IS CORRECTLY PAIRED WITH ANOTHER PICTURE OF ANOTHER VIEW FOR SPECIFIC PRESENTATION TIME AND RELATED PROCESSING APPARATUS THEREOF

CROSS REFERENCE TO RELATED APPLICATIONS

This is a continuation application of a co-pending patent application Ser. No. 13/094,803, filed on Apr. 26, 2011 and incorporated herein by reference.

BACKGROUND

The disclosed embodiments of the present invention relate to processing a video input which transmits pictures of different views, and more particularly, to a method of processing a video input by detecting if a first picture of one view is correctly paired with another picture of another view for specific presentation time and related processing apparatus thereof.

With the development of the science and technology, users are pursuing three-dimensional (3D) and more real video outputs rather than high quality two-dimensional (2D) video outputs. The 3D video content may be encoded and transmitted by one of a variety of formats. For example, when a side-by-side format or a top-and-bottom format is employed, one encoded video frame would include a left-eye picture and a right-eye picture arranged therein. Thus, with regard to decoding of the encoded video frames having the side-by-side format/top-and-bottom format, the left-eye pictures and right-eye pictures would be produced in pairs in the time domain before displayed.

In a case where the multi-view video coding (MVC) is employed to encode the 3D video content, the left-eye picture and the right-eye picture are arranged in different encoded video frames. For example, a multi-track storage scheme may be used for storing encoded video frames having the MVC format. Therefore, encoded video frames which transmit left-eye pictures are stored in one track, and encoded video frames which transmit right-eye pictures are stored in another track. Thus, with regard to decoding of the encoded video frames having the MVC format, it is not guaranteed that the left-eye pictures and right-eye pictures would be produced in pairs in the time domain before displayed.

Due to certain errors happening at the encoder side and/or the decoder side, one left-eye picture included in a decoder output may not be correctly paired with one right-eye picture included in the decoder output for following playback, and vice versa. For example, one left-eye picture and one right-eye picture generated in a pair due to decoding of the encoded video frames may have different presentation time stamps (i.e., different playback time points). Besides, it is also possible that one left-eye picture included in the decoder output is not paired with any right-eye picture, and vice versa. Therefore, at one particular presentation time, only one of the left-eye picture and the right-eye picture is available in the decoder output. These pairing errors existing in the decoder output may greatly degrade the 3D video playback quality, leading to uncomfortable 3D visual experience for the viewer.

SUMMARY OF THE INVENTION

In accordance with exemplary embodiments of the present invention, a method of processing a video input by detecting if a first picture of one view is correctly paired with another picture of another view for specific presentation time and related processing apparatus thereof are proposed to solve the above-mentioned problem.

According to a first aspect of the present invention, a method of processing a video input which includes at least a first video bitstream transmitting pictures of a first view and a second video bitstream transmitting pictures of a second view is disclosed. The method includes: checking the video input to detect if a first picture of one of the first and second views is correctly paired with a second picture of the other of the first and second views for specific presentation time, and accordingly generating a detecting result; and referring to the detecting result for selectively performing a predetermined processing operation upon the video input; wherein the video input transmits the second picture while transmitting the first picture; and the step of referring to the detecting result for selectively performing the predetermined processing operation upon the video input comprises: when the detecting result indicates that the first picture is not correctly paired with the second picture for the specific presentation time, skipping both of the first picture and the second picture, and repeating previous pictures that are correctly paired with each other for the specific presentation time.

According to a second aspect of the present invention, a method of processing a video input which includes at least a first video bitstream transmitting pictures of a first view and a second video bitstream transmitting pictures of a second view is disclosed. The method includes: checking the video input to detect if a first picture of one of the first and second views is correctly paired with a second picture of the other of the first and second views for specific presentation time, and accordingly generating a detecting result; and referring to the detecting result for selectively performing a predetermined processing operation upon the video input; wherein the video input does not transmit the second picture while transmitting the first picture, and the step of referring to the detecting result for selectively performing the predetermined processing operation upon the video input comprises: when the detecting result indicates that the first picture is not correctly paired with the second picture for the specific presentation time, skipping the first picture, and repeating previous pictures that are correctly paired with each other for the specific presentation time.

According to a third aspect of the present invention, a method of processing a video input which includes at least a first video bitstream transmitting pictures of a first view and a second video bitstream transmitting pictures of a second view is disclosed. The method includes: checking the video input to detect if a first picture of one of the first and second views is correctly paired with a second picture of the other of the first and second views for specific presentation time, and accordingly generating a detecting result; and referring to the detecting result for selectively performing a predetermined processing operation upon the video input; wherein the video input does not transmit the second picture while transmitting the first picture, and the step of referring to the detecting result for selectively performing the predetermined processing operation upon the video input comprises: when the detecting result indicates that the first picture is not correctly paired with the second picture for the specific presentation time, updating a first count value which records the number of successive times one picture of one view is not correctly paired with another picture of another view; and when the updated first count value is greater than a first predetermined threshold value, creating a third picture and transmitting both of the first picture and the third picture paired with each other for the specific presentation time.

According to a fourth aspect of the present invention, a method of processing a video input which includes at least a first video bitstream transmitting pictures of a first view and a second video bitstream transmitting pictures of a second view is disclosed. The method includes: checking the video input to detect if a first picture of one of the first and second views is correctly paired with a second picture of the other of the first and second views for specific presentation time, and accordingly generating a detecting result; and referring to the detecting result for selectively performing a predetermined processing operation upon the video input; wherein the video input transmits the second picture while transmitting the first picture, and the step of referring to the detecting result for selectively performing the predetermined processing operation upon the video input comprises: when the detecting result indicates that the first picture is not correctly paired with the second picture for the specific presentation time, updating a first count value which records the number of successive times one picture of one view is not correctly paired with another picture of another view; and when the updated first count value is greater than a first predetermined threshold value, creating a third picture of one of the first view and the second view, and transmitting both of the third picture and the selected picture paired with each other for the specific presentation time, wherein the selected picture corresponds to the other of the first view and the second view.

According to a fifth aspect of the present invention, a processing apparatus of processing a video input which includes at least a first video bitstream transmitting pictures of a first view and a second video bitstream transmitting pictures of a second view is disclosed. The processing apparatus includes a checking circuit and a processing circuit. The checking circuit is arranged for checking the video input to detect if a first picture of one of the first and second views is correctly paired with a second picture of the other of the first and second views for a specific presentation time, and accordingly generating a detecting result. The processing circuit is coupled to the checking circuit, and arranged for referring to the detecting result for selectively performing a predetermined processing operation upon the video input. The video input transmits the second picture while transmitting the first picture. When the detecting result indicates that the first picture is not correctly paired with the second picture for the specific presentation time, the processing circuit skips both of the first picture and the second picture, and repeats previous pictures that are correctly paired with each other for the specific presentation time.

According to a sixth aspect of the present invention, a processing apparatus of processing a video input which includes at least a first video bitstream transmitting pictures of a first view and a second video bitstream transmitting pictures of a second view is disclosed. The processing apparatus includes a checking circuit and a processing circuit. The checking circuit is arranged for checking the video input to detect if a first picture of one of the first and second views is correctly paired with a second picture of the other of the first and second views for a specific presentation time, and accordingly generating a detecting result. The processing circuit is coupled to the checking circuit, and arranged for referring to the detecting result for selectively performing a predetermined processing operation upon the video input. The video input does not transmit the second picture while transmitting the first picture. When the detecting result indicates that the first picture is not correctly paired with the second picture for the specific presentation time, the processing circuit skips the first picture, and repeats previous pictures that are correctly paired with each other for the specific presentation time.

According to a seventh aspect of the present invention, a processing apparatus of processing a video input which includes at least a first video bitstream transmitting pictures of a first view and a second video bitstream transmitting pictures of a second view is disclosed. The processing apparatus includes a checking circuit and a processing circuit. The checking circuit is arranged for checking the video input to detect if a first picture of one of the first and second views is correctly paired with a second picture of the other of the first and second views for a specific presentation time, and accordingly generating a detecting result. The processing circuit is coupled to the checking circuit, and arranged for referring to the detecting result for selectively performing a predetermined processing operation upon the video input. The video input does not transmit the second picture while transmitting the first picture. When the detecting result indicates that the first picture is not correctly paired with the second picture for the specific presentation time, the processing circuit updates a first count value which records the number of successive times one picture of one view is not correctly paired with another picture of another view; and when the updated first count value is greater than a first predetermined threshold value, the processing circuit creates a third picture and transmits both of the first picture and the third picture paired with each other for the specific presentation time.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

The main conception of the present invention is to detect the pairing errors existing in a video input (e.g., a decoder output) that transmits pictures of different views. Thus, when the pairing errors are identified, the video input may be properly processed/adjusted to generate a video output which is capable of meeting the requirement of a particular application. For example, regarding the 3D video playback application, the pairing errors may be removed from the video input, and a corresponding video output generated from the video input would be properly displayed for providing the user with improved 3D visual experience. Further details are described as below.

Figure 1:
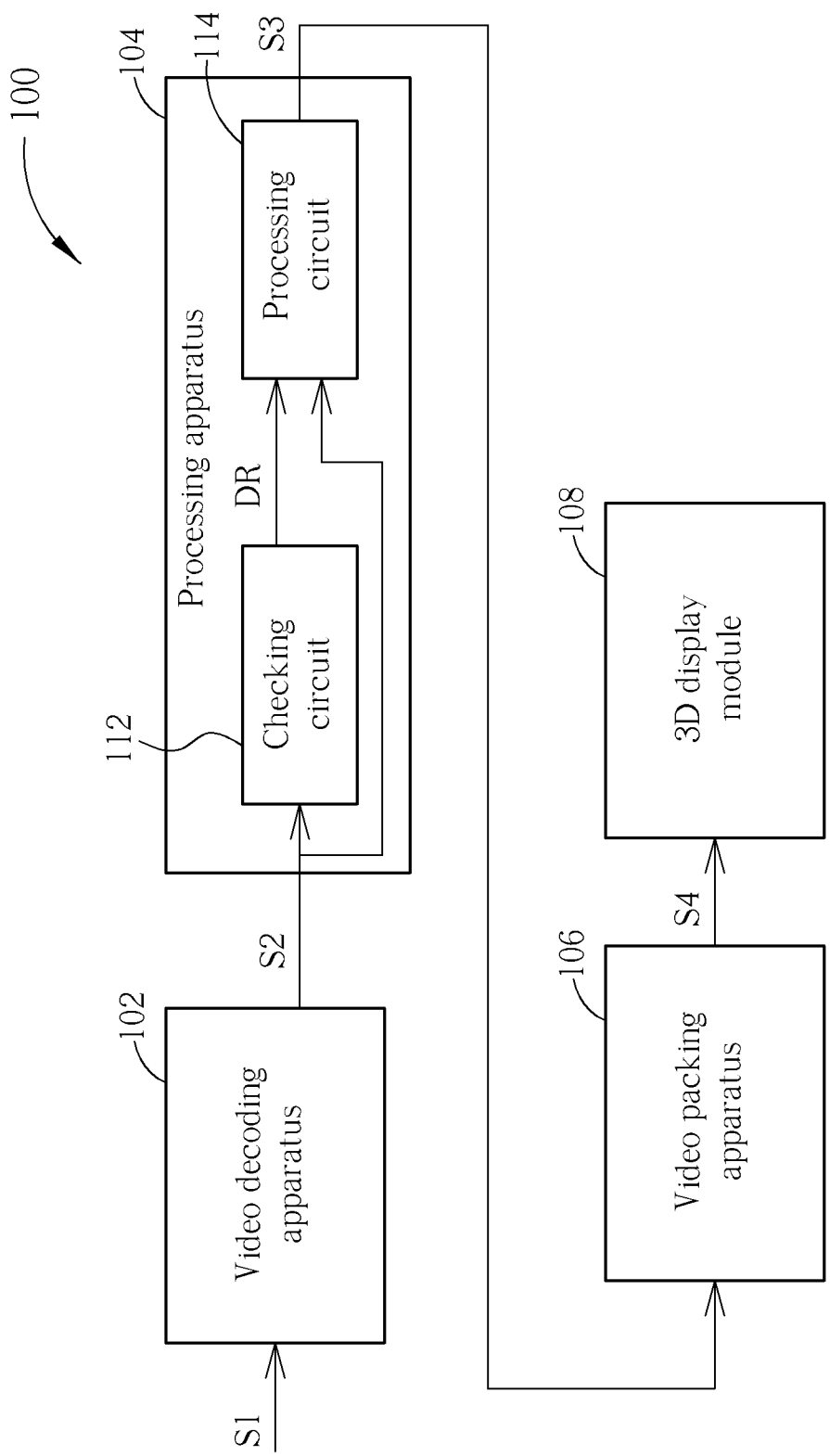
FIG. 1 is a block diagram illustrating a three-dimensional (3D) video playback system according to an exemplary embodiment of the present invention.

Please refer to FIG. 1, which is a block diagram illustrating a three-dimensional (3D) video playback system according to an exemplary embodiment of the present invention. The 3D video playback system 100 includes a video decoding apparatus 102, a processing apparatus 104, a video packing apparatus 106, and a 3D display module (e.g., a display apparatus) 108. In one exemplary design, the video decoding apparatus 102 and the processing apparatus 104 may be disposed in a same device. In another exemplary design, the video decoding apparatus 102 and the processing apparatus 104 may be disposed in different devices, and video decoding apparatus 102 may communicate with the processing apparatus 104 via a connection interface such as a high-definition multimedia interface (HDMI).

The video decoding apparatus 102 is arranged for decoding an encoded video bitstream S1 and accordingly generating a video input S2 to the following processing apparatus 104. For example, the encoded video bitstream S1 may transmit encoded video frames having the side-by-side format, the top-and-bottom format, or the MVC format. Therefore, the video decoding apparatus 102 may include one or more video decoders according to actual design requirement/consideration. In this exemplary embodiment, the video input S2 is a decoder output which includes a first video stream transmitting pictures of a first view and a second video stream transmitting pictures of a second view. For example, one of the first view and the second view corresponds to the left-eye vision, and the other of the first view and the second view corresponds to the right-eye vision. However, this is for illustrative purposes only, and is not meant to be a limitation of the present invention. The conception of the present invention may be applied to any application which requires pictures of at least two different views to be properly paired with each other. These alternative designs all obey the spirit of the present invention.

The processing apparatus 104 is coupled between the preceding video decoding apparatus 102 and the following video packing apparatus 106, and is arranged for generating a video output S3 according to the video input S2. In this exemplary embodiment, the processing apparatus 104 includes, but is not limited to, a checking circuit 112 and a processing circuit 114. The checking circuit 112 is arranged for checking the video input S2 to detect if a first picture of one of the first and second views is correctly paired with a second picture of the other of the first and second views for specific presentation time, and accordingly generating a detecting result DR. The processing circuit 114 is coupled to the checking circuit 112 and arranged to refer to the detecting result DR for selectively performing a predetermined processing operation upon the video input S2. More specifically, the checking circuit 112 is implemented to detect any pairing error existing in the video input S2 that transmits pictures of different views. When the pairing errors are identified by the checking circuit 112, the video input S2 may be properly processed/adjusted by the processing circuit 114. Further details will be described later.

Please note that the video output S3 would be the same as the video output S2 when the video input S2 has no pairing error.

The video packing apparatus 106 is arranged for receiving the video output S3 generated from the processing apparatus 104, and preparing the video data which is compatible with the 3D display module 108. That is, the video packing apparatus 106 is implemented for generating the video data with a data format supported by the 3D display module 108. The 3D display module 108 is arranged for presenting the 3D video to the viewer according to the video data.

Figure 2:
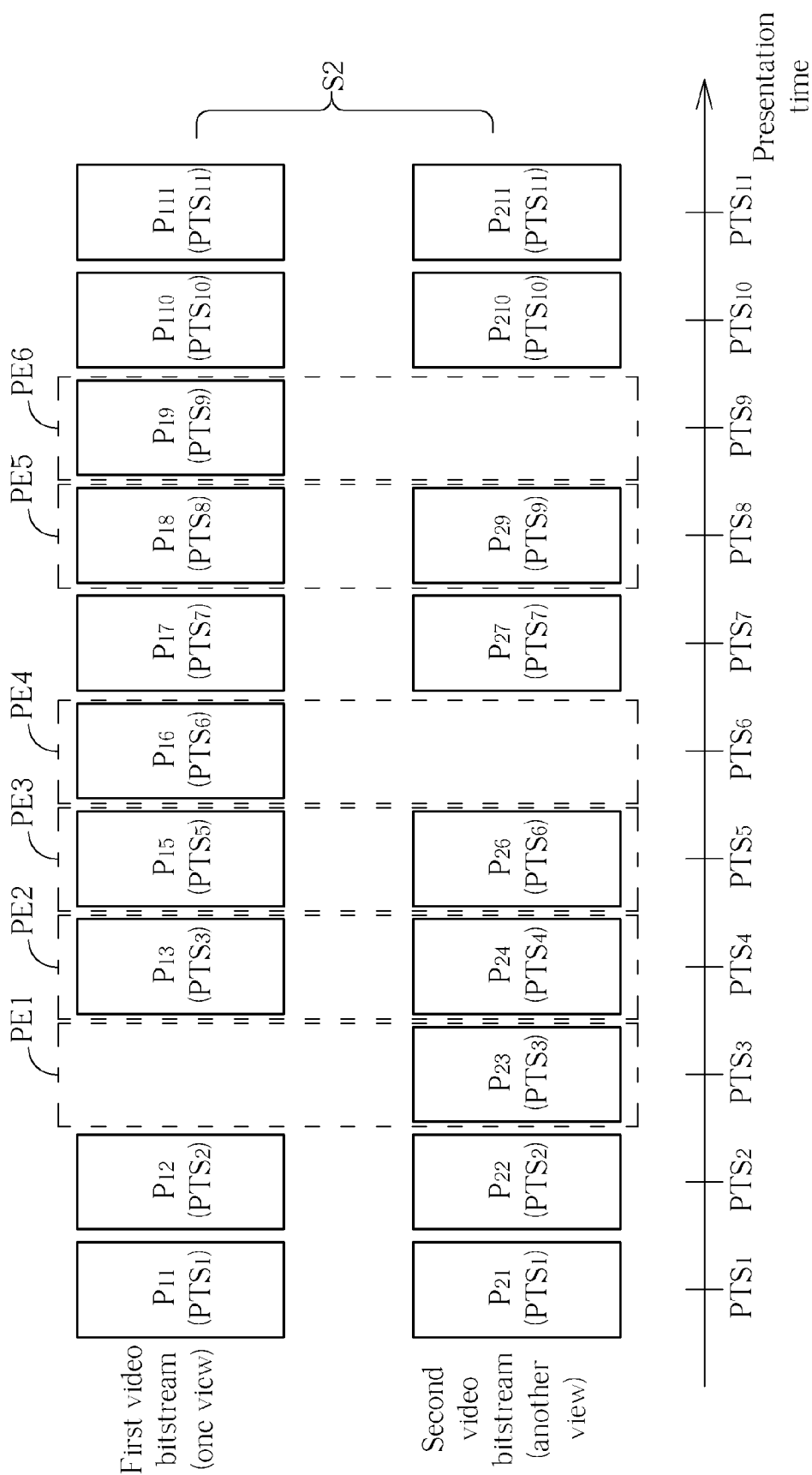
FIG. 2 is a diagram illustrating the operation of a checking circuit which employs a first detection scheme.

Regarding the detection of any pairing error existing in the video input S2, the checking circuit 112 may employ one of a plurality of feasible detection schemes. For example, when a first detection scheme is employed, the checking circuit 112 detects if a first picture of one of the first and second views is correctly paired with a second picture of the other of the first and second views for specific presentation time by referring to a presentation time stamp (PTS) value of the first picture for determining whether the video input includes the second picture that is correctly paired with the first picture for the specific presentation time due to having a PTS value identical to the PTS value of the first picture. Please refer to FIG. 2, which is a diagram illustrating the operation of the checking circuit 112 which employs the first detection scheme. As shown in FIG. 2, the video input S2 includes successively transmitted pictures $P_{11}$-$P_{13}$ and $P_{15}$-$P_{111}$ of one view, and also includes successively transmitted pictures $P_{21}$-$P_{24}$, $P_{26}$-$P_{27}$, $P_{29}$, and $P_{210}$-$P_{211}$ of another view. Please note that the pictures (e.g., left-eye pictures) $P_{11}$-$P_{13}$ and $P_{15}$-$P_{111}$ have PTS values equal to presentation time $PTS_1$-$PTS_3$ and $PTS_5$-$PTS_{11}$, respectively, and the pictures (e.g., right-eye pictures) $P_{21}$-$P_{24}$/$P_{26}$-$P_{27}$/$P_{29}$, and $P_{210}$-$P_{211}$ have PTS values equal to presentation time $PTS_1$-$PTS_4$, $PTS_6$-$PTS_7$, $PTS_9$, and $PTS_{10}$-$PTS_{11}$, respectively. As can be seen from the figure, the pictures $P_{11}$ and $P_{21}$ are correctly paired with each other for the presentation time $PTS_1$, the pictures $P_{12}$ and $P_{22}$ are correctly paired with each other for the presentation time $PTS_2$, the pictures $P_{17}$ and $P_{27}$ are correctly paired with each other for the presentation time $PTS_7$, the pictures $P_{110}$ and $P_{210}$ are correctly paired with each other for the presentation time $PTS_{10}$, and the pictures $P_{111}$ and $P_{211}$ are correctly paired with each other for the presentation time $PTS_{11}$.

However, there are several pairing errors PE1-PE6 existing in the video input S2, and would be identified by the checking circuit 112. By way of example, but not limitation, the pairing errors PE1-PE4 may be found under a condition where each of the first video bitstream including pictures $P_{11}$-$P_{13}$ and $P_{15}$-$P_{19}$ and the second video bitstream including pictures $P_{21}$-$P_{24}$/$P_{26}$-$P_{27}$/and $P_{29}$ is processed under an audio-video synchronization mode, and the pairing errors PE5-PE6 may be found under another condition where at least one of the first video bitstream and the second video bitstream is not processed under the audio-video synchronization mode.

Due to encoding error at the encoder side and/or decoding error at the decoder side, a picture which should immediately follow the picture $P_{12}$ is not correctly produced in the first video bitstream of the video input S2. Thus, the audio-video synchronization operation indicates that the playback of the first video bitstream is not synchronized with the playback of the audio bitstream (not shown) at the presentation time $PTS_3$, whereas the audio-video synchronization operation indicates that the playback of the second video bitstream is synchronized with the playback of the audio bitstream at the presentation time $PTS_3$. Based on the information given from the audio-video synchronization operation which may be performed by the checking circuit 112 or other circuit, the checking circuit 112 detects that the picture $P_{23}$ is not correctly paired with a picture of a different view for the presentation time $PTS_3$. Thus, the pairing error PE1 is identified by the checking circuit 112.

Regarding the pictures $P_{13}$ and $P_{24}$, the PTS value of the picture $P_{13}$ indicates the presentation time $PTS_3$ which is prior to the current presentation time $PTS_4$, and the PTS value of the picture $P_{23}$ indicates the presentation time $PTS_4$ which is identical to the current presentation time $PTS_4$. Therefore, the audio-video synchronization operation indicates that the picture $P_{13}$ should be skipped/dropped, implying that the playback of the first video bitstream is not synchronized with the playback of the audio bitstream at the presentation time $PTS_4$. However, the audio-video synchronization operation indicates that the playback of the second video bitstream is synchronized with the playback of the audio bitstream at the presentation time $PTS_4$. Based on the information given from the audio-video synchronization operation, the checking circuit 112 detects that the picture $P_{24}$ is not correctly paired with the picture $P_{13}$ for the presentation time $PTS_4$. Thus, the pairing error PE2 is identified by the checking circuit 112.

Regarding the pictures $P_{15}$ and $P_{26}$, the PTS value of the picture $P_{26}$ indicates the presentation time $PTS_6$ which is later than the current presentation time $PTS_6$, and the PTS value of the picture $P_{15}$ indicates the presentation time $PTS_6$ which is identical to the current presentation time $PTS_6$. Therefore, the audio-video synchronization operation indicates that the picture $P_{26}$ should be repeated, implying that the playback of the second video bitstream is not synchronized with the playback of the audio bitstream at the presentation time $PTS_6$. However, the audio-video synchronization operation indicates that the playback of the first video bitstream is synchronized with the playback of the audio bitstream at the presentation time $PTS_6$. Based on the information given from the audio-video synchronization operation, the checking circuit 112 detects that the picture $P_{15}$ is not correctly paired with the picture $P_{26}$ for the presentation time $PTS_6$. Thus, the pairing error PE3 is identified by the checking circuit 112.

Due to encoding error at the encoder side and/or the decoding error at the decoder side, a picture which should immediately follow the picture $P_{26}$ is not correctly produced in the second video bitstream of the video input S2. Consider a case where the picture $P_{26}$ received at the previous presentation time $PTS_6$ is not stored into a buffer under some conditions. Thus, the audio-video synchronization operation indicates that the playback of the second video bitstream is not synchronized with the playback of the audio bitstream at the presentation time $PTS_6$; however, the audio-video synchronization operation indicates that the playback of the first video bitstream is synchronized with the playback of the audio bitstream at the presentation time $PTS_6$. Based on the information given from the audio-video synchronization operation, the checking circuit 112 detects that the picture $P_{16}$ is not correctly paired with a picture of a different view for the presentation time $PTS_6$. Thus, the pairing error PE4 is identified by the checking circuit 112.

However, consider another case where the picture $P_{26}$ received at the previous presentation time $PTS_5$ would be stored into a buffer under some conditions. As the desired picture $P_{26}$ with the PTS value identical to the current presentation time $PTS_6$ can be obtained from the buffer, the audio-video synchronization operation indicates that the playback of the second video bitstream is synchronized with the playback of the audio bitstream at the presentation time $PTS_6$. Besides, the audio-video synchronization operation indicates that the playback of the first video bitstream is also synchronized with the playback of the audio bitstream at the presentation time $PTS_6$. Based on the information given from the audio-video synchronization operation, the checking circuit 112 does not find any pairing error (e.g., the aforementioned pairing error PE4) at the current presentation time $PTS_6$.

Suppose that at least one of the first video bitstream and the second video bitstream is not processed under an audio-video synchronization mode after the presentation time $PTS_6$. The checking circuit 112 may still refer to the PTS value of each picture to identify the pairing error. For example, the PTS value of the picture $P_{17}$ of one view is identical to PTS value of the picture $P_{27}$ of another view. The checking circuit 112 therefore determines that the pictures $P_{17}$ and $P_{27}$ are correctly paired with each other for the presentation time $PTS_7$.

Regarding the pictures $P_{18}$ and $P_{29}$, the PTS value of the picture $P_{29}$ is different from the PTS value of the picture $P_{18}$. Therefore, the checking circuit 112 determines that the pictures $P_{18}$ and $P_{29}$ are not correctly paired with each other for the presentation time $PTS_8$, and identifies the pairing error PE5 accordingly. Moreover, due to the encoding error at the encoder side and/or the decoding error at the decoder side, a picture which should immediately follow the picture $P_{29}$ is not correctly produced in the second video bitstream of the video input S2. As there is only one picture $P_{19}$ with a PTS value indicating the presentation time $PTS_9$ which is identical to the current presentation time $PTS_9$, the checking circuit 112 therefore determines that the picture $P_{19}$ is not correctly paired with a picture of a different view for the presentation time $PTS_9$, and identifies the pairing error PE6 accordingly.

To put it simply, no matter whether the video input transmits one picture of one view while transmitting another picture of another view at specific presentation time (e.g., $PTS_3$, $PTS_8$, or $PTS_9$) or does not transmit one picture of one view while transmitting another picture of another view at specific presentation time (e.g., $PTS_4$, $PTS_5$, $PTS_7$, or $PTS_8$), the checking circuit 112 which employs the first detection scheme is capable of identifying the pairing error. Please note that the example shown in FIG. 2 is for illustrative purposes only. In practice, the checking circuit 112 which employs the first detection scheme is capable of identifying different types of pairing errors existing in the video input S2 by checking PTS values of the pictures.

Alternatively, the checking circuit 112 may employ a second detection scheme and therefore perform a content comparison upon a first picture and a second picture to determine whether the first picture and the second picture are correctly paired with each other for specific presentation time. Please refer to FIG. 3, which is a diagram illustrating the operation of the checking circuit 102 which employs the second detection scheme. In this exemplary embodiment, the checking circuit 102 performs a motion estimation between the first picture (e.g., one of a left-eye picture and a right-eye picture) 302 and the second picture (e.g., the other of the left-eye picture and the right-eye picture) 304, and accordingly generates a motion estimation result (e.g., at least one estimated motion vector MV), and determines whether the first picture 302 and the second picture 304 are paired with each other for the specific presentation time according to the motion estimation result. Normally, the difference between a left-eye picture and a right-eye picture that are correctly paired with each other occurs in a horizontal direction only, and the difference between the left-eye picture and the right-eye picture in a vertical direction should be small. Therefore, when the motion estimation result (e.g., the motion vector MV which is consisted of a motion vector component $MV_x$ in a horizontal direction and a motion vector component $MV_y$ in a vertical direction) indicates that the motion vector component $MV_y$ in the vertical direction is larger than a predetermined threshold value, the checking circuit 112 determines that the first picture 302 and the second picture 304 are not correctly paired with each other for the specific presentation time.

Figure 3:
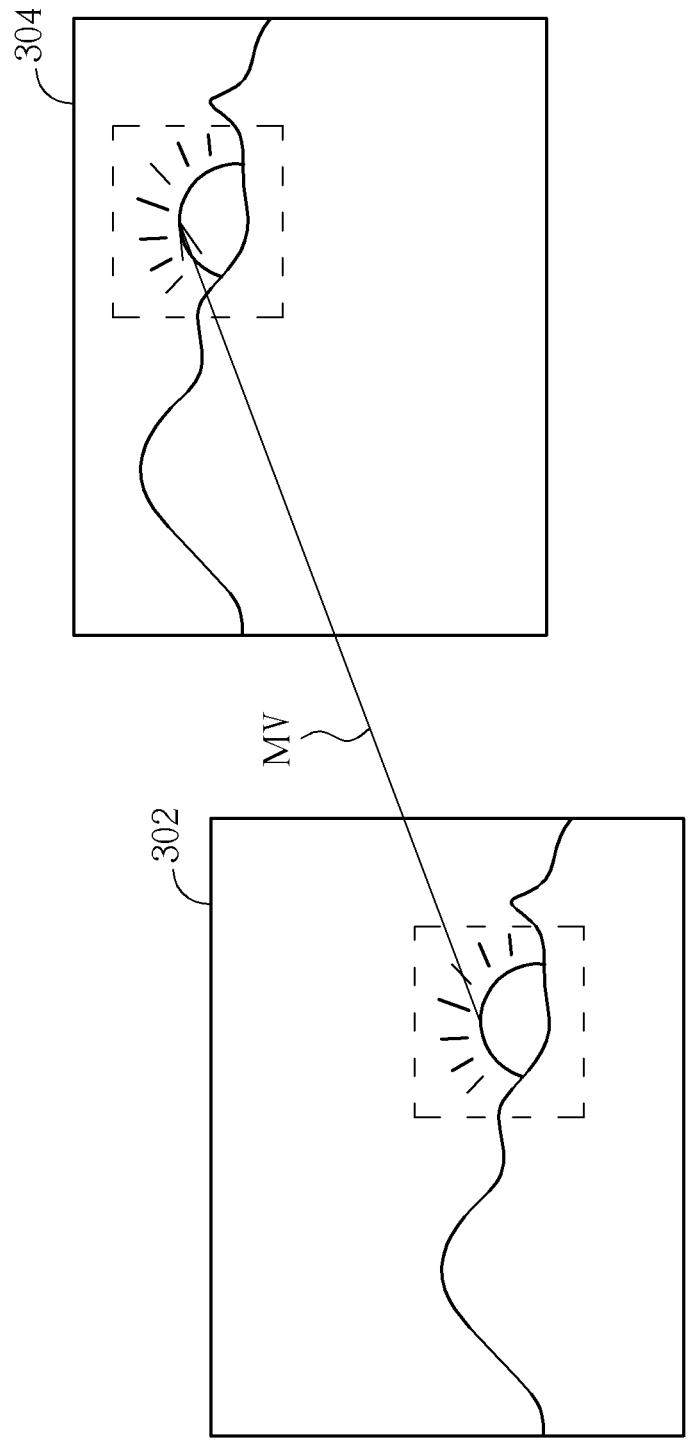
FIG. 3 is a diagram illustrating the operation of a checking circuit which employs a second detection scheme.

In the example shown in FIG. 3, only one motion vector MV is found using any motion estimation technique. However, this is not meant to be a limitation of the present invention. In an alternative design, the checking circuit 112 may find more than one motion vector between the first picture 302 and the second picture 304 and then judges whether the first picture 302 and the second picture 304 are correctly paired with each other according to the found motion vectors. By way of example, but not limitation, the checking circuit 112 determines that the first picture 302 and the second picture 304 are not correctly paired with each other for the specific presentation time when at least one of the found motion vectors has a motion vector component in a vertical direction that is larger than the predetermined threshold value.

Figure 4:
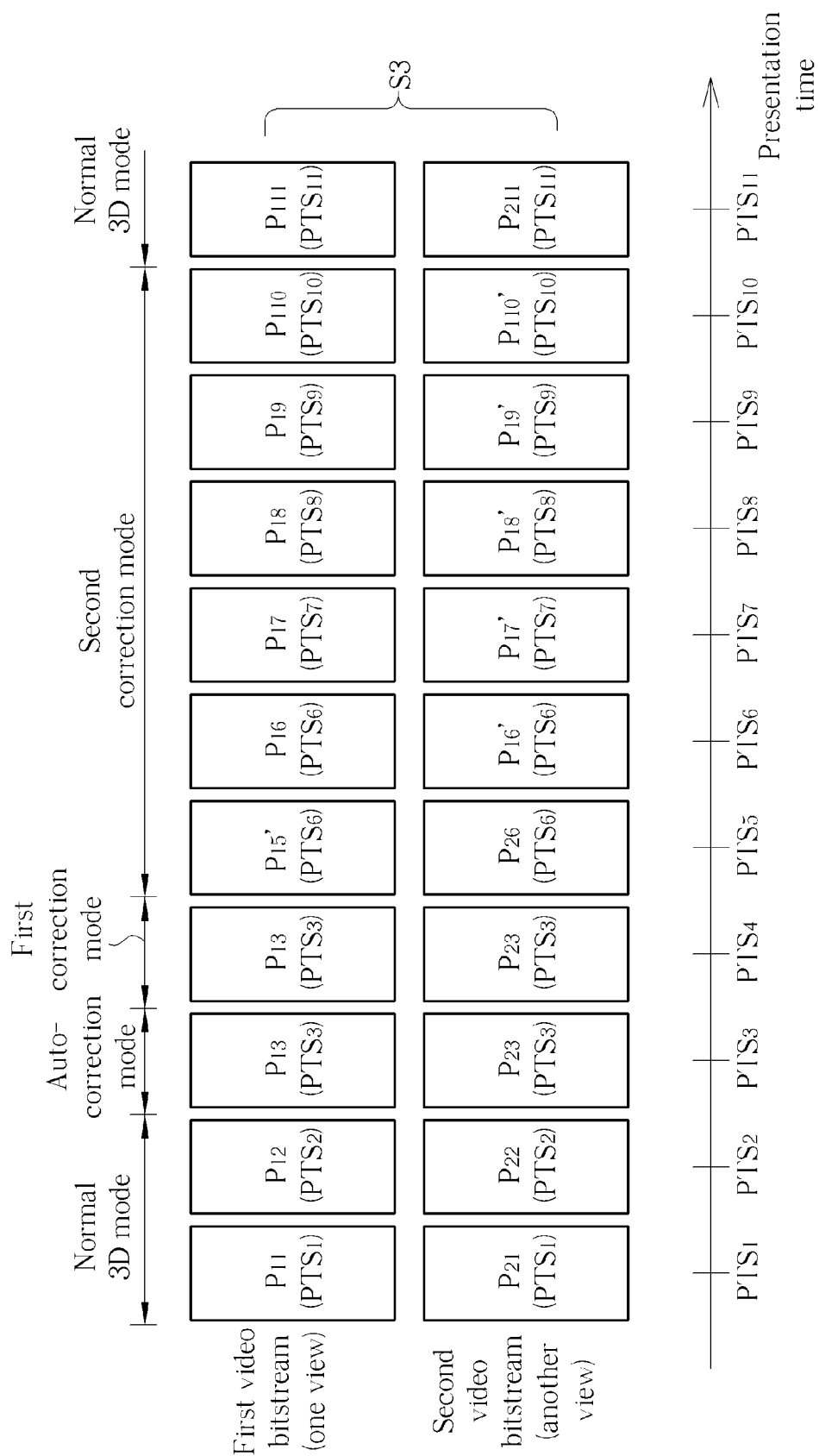
FIG. 4 is a diagram illustrating a video output generated from a processing apparatus according to an exemplary embodiment of the present invention.

When a pairing error is detected by the checking circuit 112, the processing circuit 114 is operative to correct/remove the identified pairing error. Please refer to FIG. 2 in conjunction with FIG. 4. FIG. 4 is a diagram illustrating the video output S3 generated from the processing apparatus 104 according to an exemplary embodiment of the present invention. Regarding the pairing error PE1 shown in FIG. 2, the detecting result DR generated from the checking circuit 112 indicates that the picture $P_{23}$ of one view is not correctly paired with a picture of another view for the presentation time $PTS_3$. Initially, the processing circuit 114 is operated in an auto-correction mode. The processing circuit 114 therefore searches the video input S2 for a specific picture (e.g., the picture $P_{13}$) that is capable of being paired with the picture $P_{23}$, and transmits both of the picture $P_{23}$ and the specific picture (e.g., the picture $P_{13}$) for the presentation time $PTS_3$, as shown in FIG. 4.

However, considering another case where searching the video input S2 for a specific picture that is capable of being paired with the picture $P_{23}$ fails to find the desired specific picture, the processing circuit 114 skips/drops the existing picture $P_{23}$ and repeats previous pictures of different views that are correctly paired with each other. More specifically, as the video input S2 does not transmit a picture of a different view while transmitting the picture $P_{23}$, the processing circuit 114 replaces the picture $P_{23}$ by one of the previous pictures $P_{12}$ and $P_{22}$.

Regarding the pairing error PE2 shown in FIG. 2, the detecting result DR generated from the checking circuit 112 indicates that the picture $P_{24}$ is not correctly paired with the picture $P_{13}$ for the presentation time $PTS_4$. The processing circuit 114 therefore searches the video input S2 for a specific picture that is capable of being paired with the picture $P_{24}$. However, in this exemplary embodiment, searching the video input S2 for a specific picture with a PTS value equal to the presentation time $PTS_4$ fails to successfully find the desired specific picture, the processing circuit 114 skips/drops both of the pictures $P_{13}$ and $P_{24}$, and repeats previous pictures of different views that are correctly paired with each other. More specifically, as the video input S2 transmits the picture $P_{24}$ while transmitting the picture $P_{13}$, the processing circuit 114 replaces both of the pictures $P_{13}$ and $P_{24}$ by previous pictures $P_{13}$ and $P_{23}$, respectively. Besides, when searching the video input S2 for a specific picture with a PTS value equal to the presentation time $PTS_4$ fails to find the desired specific picture, the processing circuit 114 further updates a first count value CNT1 which is used to record the number of successive times one picture of one view is not correctly paired with another picture of another view, and checks if the updated first count value CNT1 is greater than a first predetermined threshold value THRD1. For example, the first predetermined threshold value THRD1 may be 1 in one exemplary implementation. Please note that the first predetermined threshold value THRD1 may be adjusted according to actual design requirement/consideration. In this exemplary embodiment, the first count value CNT1 updated by the processing circuit 114 would be 1 due to the fact that the pairing error PE1 is the first pairing error found in the video input S2. As the updated first count value CNT1 is not greater than the predetermined threshold value THRD1, the processing circuit 114 is operated in a first correction mode to repeat previous pictures $P_{13}$ and $P_{23}$ for correcting the pairing error PE2.

Regarding the pairing error PE3 shown in FIG. 2, the detecting result DR generated from the checking circuit 112 indicates that the picture $P_{15}$ is not correctly paired with the picture $P_{26}$ for the presentation time $PTS_5$. As mentioned above, the processing circuit 114 updates the first count value CNT1 in response to the successive pairing errors found by the checking circuit 112. Therefore, the updated first count value CNT1 becomes 2, and is greater than the predetermined threshold value THRD1. As the video input S2 transmits the picture $P_{15}$ of one view while transmitting the picture $P_{26}$ of another view, the processing circuit 114 is operated in a second correction mode to correct the pairing error PE3 by creating a picture to be paired with a selected picture of the pictures $P_{15}$ and $P_{26}$ and skipping/dropping an unselected picture of the pictures $P_{15}$ and $P_{26}$. In one exemplary implementation, the selected picture belongs to one of the first video bitstream and the second video bitstream that has less contribution to identified pairing errors in the video input S2. As the second video bitstream that has less contribution to identified pairing errors PE1-PE3, the selected picture would be the picture $P_{26}$. Therefore, the picture $P_{15}$ will be replaced by the created picture $P_{15}'$. By way of example, but not limitation, the picture $P_{15}'$ may be generated by a duplicate of the selected picture (i.e., $P_{15}'=P_{26}$), or may be generated by performing a two-dimensional-to-three-dimensional (2D-to-3D) conversion upon the selected picture.

Regarding the pairing error PE4 shown in FIG. 2, the detecting result DR generated from the checking circuit 112 indicates that the picture $P_{16}$ is not correctly paired with a picture of a different view for the presentation time $PTS_6$. As the processing circuit 114 is now operated in the second correction mode and the video input S2 does not transmit a picture of a different view while transmitting the picture $P_{16}$, the processing circuit 114 corrects the pairing error PE4 by generating a duplicate of the existing picture $P_{16}$ as the picture $P_{16}'$ to be paired with the existing picture $P_{16}$, or performing a 2D-to-3D conversion upon the existing picture $P_{16}$ to generate the picture $P_{16}'$ to be paired with the existing picture $P_{16}$.

As mentioned above, when searching the video input S2 for a specific picture for correcting the detected pairing error under the auto-correction mode fails to find the desired specific picture, the processing circuit 114 leaves the auto-correction mode, and enters the first correction mode for correcting the detected pairing error by repeating previous pictures that are correctly paired with each other. However, after the updated first count value CNT1 is greater than the first predetermined threshold value THRD1, the processing circuit 114 leaves the first correction mode, and enters the second correction mode for correcting the detected pairing error by creating a picture through picture duplication or 2D-to-3D conversion. In this exemplary embodiment, when the processing circuit 114 is operated in the second correction mode, the processing circuit 114 further updates a second count value CNT2 which is used to record the number of successive times one picture of one view is correctly paired with another picture of another view. The processing circuit 114 does not stopping creating a picture to be paired with an existing picture for correcting a detected pairing error until the second count value CNT2 is greater than a second predetermined threshold value THRD2. For example, the predetermined threshold value THRD2 may be 1 in one exemplary implementation. Please note that the predetermined threshold value THRD2 may be adjusted according to actual design requirement/consideration. With a proper setting of the second predetermined threshold value THRD2, the correctly paired pictures found in the video input S2 will not be directly outputted as part of the video output S3 unless the second count value CNT2 is greater than the second predetermined threshold value THRD2. In this way, the frequent toggling between the normal 3D mode and the pairing error correction mode (i.e., the aforementioned auto-correction mode or second correction mode) can be avoided, thus improving viewer's 3D visual experience.

As shown in FIG. 2, pictures $P_{17}$ and $P_{27}$ are correctly paired with each other for the presentation time $PTS_7$. Thus, the second count value CNT2 is updated to be 1 due to the fact that the pair of pictures $P_{17}$ and $P_{27}$ is the first correct pair found after the pairing error PE4 is detected. As the second count value CNT2 is not greater than the second predetermined threshold value THRD2 yet, the picture $P_{17}'$ is created to be paired with the existing picture $P_{17}$, as shown in FIG. 4. Additional pairing errors PE 5 and PE6 are successively detected after the correctly paired pictures $P_{17}$ and $P_{27}$ are detected. Thus, the second count value CNT2 will not exceed the second predetermined threshold value THRD2.

As shown in FIG. 2, pictures $P_{110}$ and $P_{210}$ are correctly paired with each other for the presentation time $PTS_{10}$. Thus, the second count value CNT2 is set by 1 due to the fact that the pair of pictures $P_{110}$ and $P_{210}$ is the first correct pair found after the pairing error PE6 is identified. As the second count value CNT2 is not greater than the second predetermined threshold value THRD2 yet, the picture $P_{110}'$ is created to be paired with the existing picture $P_{110}$, as shown in FIG. 4. Next, pictures $P_{111}$ and $P_{211}$ are correctly paired with each other for the presentation time $PTS_{11}$. Thus, the second count value CNT2 is updated to be 2 which is greater than the second predetermined threshold value THRD2. Therefore, the processing circuit 114 leaves the second correction mode, and enters the normal 3D mode for outputting the correct pair of pictures $P_{111}$ and $P_{211}$ as part of the video output S3.

Figure 5:
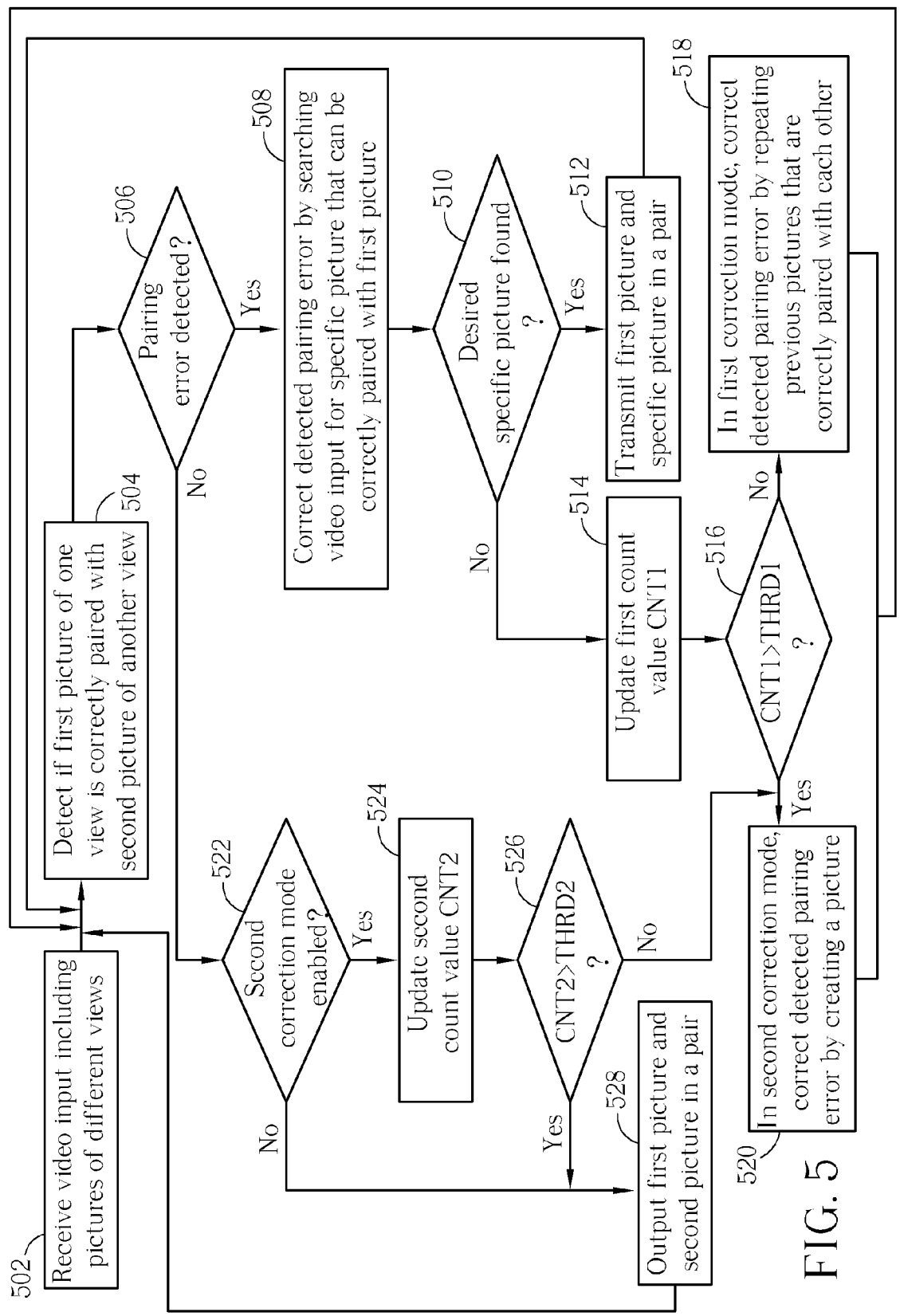
FIG. 5 is a flowchart illustrating a method of processing a video input that includes a first video bitstream transmitting pictures of a first view and a second video bitstream transmitting pictures of a second view according to an exemplary embodiment of the present invention.

Please refer to FIG. 5, which is a flowchart illustrating a method of processing a video input that includes a first video bitstream transmitting pictures of a first view and a second video bitstream transmitting pictures of a second view according to an exemplary embodiment of the present invention. Provided that the result is substantially the same, the steps are not required to be executed in the exact order shown in FIG. 5. The exemplary method may be employed by the exemplary processing apparatus 104 shown in FIG. 1, and may be briefly summarized as below.

Step 502: Receive a video input which includes at least a first video bitstream transmitting pictures of a first view and a second video bitstream transmitting pictures of a second view.

Step 504: Check the video input to detect if a first picture of one of the first and second views is correctly paired with a second picture of the other of the first and second views for specific presentation time, and accordingly generate a detecting result.

Step 506: Does the detecting result indicate a pairing error? If yes, go to step 508; otherwise, go to step 522.

Step 508: In an auto-correction mode, search the video input for a specific picture that can be correctly paired with the first picture for correcting the detected pairing error.

Step 510: Is the desired specific picture found in the video input successfully? If yes, go to step 512; otherwise, go to step 514.

Step 512: Transmit both of the existing first picture and the found specific picture for the specific presentation time. Go to step 504 to keep processing following picture(s).

Step 514: Update a first count value CNT1 which records the number of successive times one picture of one view is not correctly paired with another picture of another view.

Step 516: Check if the first count value CNT1 is greater than a first predetermined threshold value THRD1. If yes, go to step 520; otherwise, go to step 518.

Step 518: In a first correction mode, correct the detected pairing error by repeating previous pictures that are correctly paired with each other. Go to step 504 to keep processing following picture(s).

Step 520: In a second correction mode, correct the detected pairing error by creating a picture through picture duplication or 2D-to-3D conversion. Go to step 504 to keep processing following picture(s).

Step 522: Is the second correction mode enabled now? If yes, go to step 524; otherwise, go to step 528.

Step 524: Update a second count value CNT2 which records the number of successive times one picture of one view is correctly paired with another picture of another view.

Step 526: Check if the second count value CNT2 is greater than a second predetermined threshold value THRD2. If yes, go to step 528; otherwise, go to step 520.

Step 528: Output the first picture and the second picture in a pair for the specific presentation time. Go to step 504 to keep processing following picture(s).

Steps 502 and 504 may be performed by the checking circuit 112 shown in FIG. 1, and steps 506-528 may be performed by the processing circuit 114 shown in FIG. 1. As a person skilled in the art can readily understand the operation of each step shown in FIG. 5 after reading above paragraphs directed to the processing apparatus 104, further description is omitted here for brevity.

In the aforementioned exemplary embodiment, the video output S3 is generated for following 3D video playback. However, the output of the processing apparatus 104 is not limited to such an application only. For example, the video output S3 generated from the processing apparatus 104 may be recorded in a storage medium (e.g., a memory device, an optical disc, or a hard disk) rather than transmitted to the video packing apparatus 106.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of processing a video input which includes at least a first video bitstream transmitting pictures of a first view and a second video bitstream transmitting pictures of a second view, comprising:

checking the video input to detect if a first picture of one of the first and second views is correctly paired with a second picture of the other of the first and second views for specific presentation time, and accordingly generating a detecting result; and referring to the detecting result for selectively performing a predetermined processing operation upon the video input;

wherein the video input transmits the second picture while transmitting the first picture; and the step of referring to the detecting result for selectively performing the predetermined processing operation upon the video input comprises:

when the detecting result indicates that the first picture is not correctly paired with the second picture for the specific presentation time, skipping both of the first picture and the second picture, and repeating previous pictures that are correctly paired with each other for the specific presentation time.

2. The method of claim 1, wherein the step of checking the video input comprises:

referring to a presentation time stamp (PTS) value of the first picture to determine whether the video input includes the second picture that is correctly paired with the first picture for the specific presentation time due to having a PTS value identical to the PTS value of the first picture.

3. The method of claim 1, wherein the step of checking the video input comprises:

performing a content comparison upon the first picture and the second picture to determine whether the first picture and the second picture are correctly paired with each other for the specific presentation time.

4. The method of claim 3, wherein the step of performing the content comparison upon the first picture and the second picture comprises:

performing a motion estimation between the first picture and the second picture, and accordingly generating a motion estimation result; and determining whether the first picture and the second picture are paired with each other for the specific presentation time according to the motion estimation result.

5. The method of claim 4, wherein the step of determining whether the first picture and the second picture are correctly paired with each other for the specific presentation time according to the motion estimation result comprises:

when the motion estimation result indicates that a motion vector component in a vertical direction is larger than a predetermined threshold value, determining that the first picture and the second picture are not correctly paired with each other for the specific presentation time.

6. A method of processing a video input which includes at least a first video bitstream transmitting pictures of a first view and a second video bitstream transmitting pictures of a second view, comprising:

checking the video input to detect if a first picture of one of the first and second views is correctly paired with a second picture of the other of the first and second views for specific presentation time, and accordingly generating a detecting result; and referring to the detecting result for selectively performing a predetermined processing operation upon the video input;

wherein the video input does not transmit the second picture while transmitting the first picture, and the step of referring to the detecting result for selectively performing the predetermined processing operation upon the video input comprises:

when the detecting result indicates that the first picture is not correctly paired with the second picture for the specific presentation time, updating a first count value which records the number of successive times one picture of one view is not correctly paired with another picture of another view; and when the updated first count value is greater than a first predetermined threshold value, creating a third picture and transmitting both of the first picture and the third picture paired with each other for the specific presentation time.

7. The method of claim 6, wherein the step of creating the third picture comprises:

generating a duplicate of the first picture as the third picture.

8. The method of claim 6, wherein the step of creating the third picture comprises:

generating the third picture by performing a two-dimensional-to-three-dimensional (2D-to-3D) conversion upon the first picture.

9. The method of claim 6, further comprising:

after the updated first count value is greater than the first predetermined threshold value, updating a second count value which records the number of successive times one picture of one view is correctly paired with another picture of another view; and not stopping creating a picture of one of the first view and the second view to be paired with an existing picture of the other of the first view and the second view until the second count value is greater than a second predetermined threshold value.

10. A method of processing a video input which includes at least a first video bitstream transmitting pictures of a first view and a second video bitstream transmitting pictures of a second view, comprising:

checking the video input to detect if a first picture of one of the first and second views is correctly paired with a second picture of the other of the first and second views for specific presentation time, and accordingly generating a detecting result; and referring to the detecting result for selectively performing a predetermined processing operation upon the video input;

wherein the video input transmits the second picture while transmitting the first picture, and the step of referring to the detecting result for selectively performing the predetermined processing operation upon the video input comprises:

when the detecting result indicates that the first picture is not correctly paired with the second picture for the specific presentation time, updating a first count value which records the number of successive times one picture of one view is not correctly paired with another picture of another view; and when the updated first count value is greater than a first predetermined threshold value, creating a third picture of one of the first view and the second view, and transmitting both of the third picture and the selected picture paired with each other for the specific presentation time, wherein the selected picture corresponds to the other of the first view and the second view.

11. The method of claim 10, wherein the step of creating the third picture comprises:

generating a duplicate of the selected picture as the third picture.

12. The method of claim 10, wherein the step of creating the third picture comprises:

generating the third picture by performing a two-dimensional-to-three-dimensional (2D-to-3D) conversion upon the selected picture.

13. The method of claim 10, wherein the selected picture belongs to one of the first video bitstream and the second video bitstream that has less contribution to detected pairing errors.

14. The method of claim 10, further comprising:

after the updated first count value is greater than the first predetermined threshold value, updating a second count value which records the number of successive times one picture of one view is correctly paired with another picture of another view; and not stopping creating a picture of one of the first view and the second view to be paired with an existing picture of the other of the first view and the second view until the second count value is greater than a second threshold value.

15. A processing apparatus of processing a video input which includes at least a first video bitstream transmitting pictures of a first view and a second video bitstream transmitting pictures of a second view, comprising:

a checking circuit, arranged for checking the video input to detect if a first picture of one of the first and second views is correctly paired with a second picture of the other of the first and second views for a specific presentation time, and accordingly generating a detecting result; and a processing circuit, coupled to the checking circuit and arranged for referring to the detecting result for selectively performing a predetermined processing operation upon the video input;

wherein the video input transmits the second picture while transmitting the first picture; when the detecting result indicates that the first picture is not correctly paired with the second picture for the specific presentation time, the processing circuit skips both of the first picture and the second picture, and repeats previous pictures that are correctly paired with each other for the specific presentation time.

16. The processing apparatus of claim 15, wherein the checking circuit refers to a presentation time stamp (PTS) value of the first picture to determine whether the video input includes the second picture that is correctly paired with the first picture for the specific presentation time due to having a PTS value identical to the PTS value of the first picture.

17. The processing apparatus of claim 15, wherein the checking circuit performs a content comparison upon the first picture and the second picture to determine whether the first picture and the second picture are correctly paired with each other for the specific presentation time.

18. A processing apparatus of processing a video input which includes at least a first video bitstream transmitting pictures of a first view and a second video bitstream transmitting pictures of a second view, comprising:

a checking circuit, arranged for checking the video input to detect if a first picture of one of the first and second views is correctly paired with a second picture of the other of the first and second views for a specific presentation time, and accordingly generating a detecting result; and a processing circuit, coupled to the checking circuit and arranged for referring to the detecting result for selectively performing a predetermined processing operation upon the video input;

wherein the video input does not transmit the second picture while transmitting the first picture; when the detecting result indicates that the first picture is not correctly paired with the second picture for the specific presentation time, the processing circuit updates a first count value which records the number of successive times one picture of one view is not correctly paired with another picture of another view; and when the updated first count value is greater than a first predetermined threshold value, the processing circuit creates a third picture and transmits both of the first picture and the third picture paired with each other for the specific presentation time.

\* \* \* \* \*